Oct. 14, 1924.
A. N. OTIS
1,512,008
TEMPERATURE REGULATOR
Filed Feb. 4, 1922
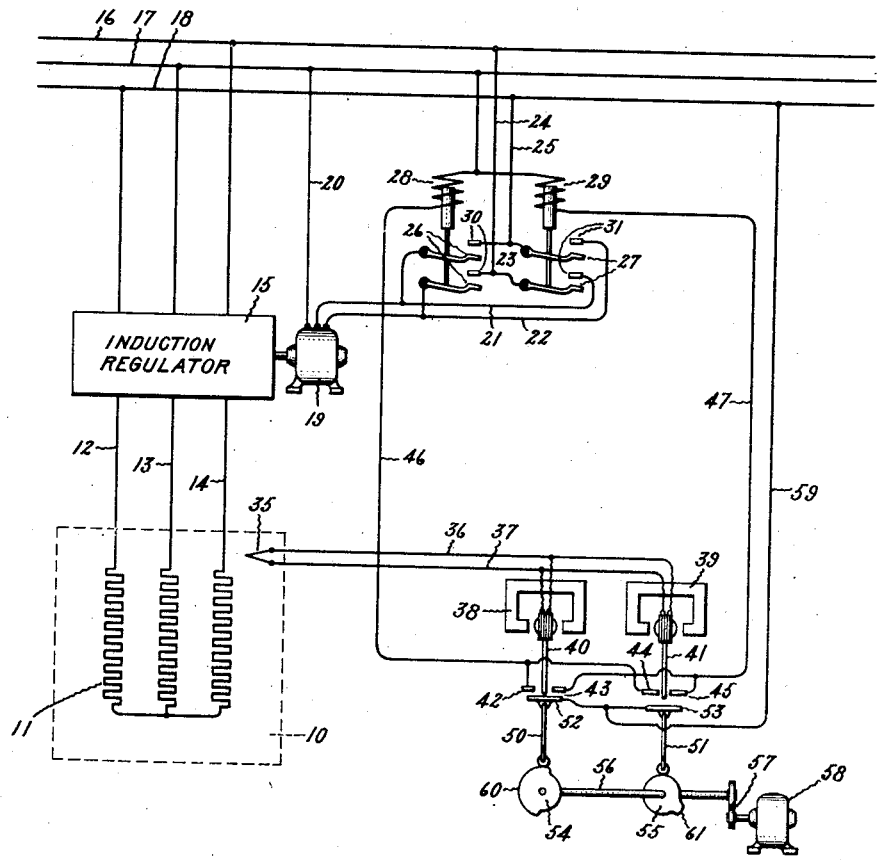
Inventor:
Albert N. Otis,
by Albert G. Davis
His Attorney.

Patented Oct. 14, 1924.

1,512,008

UNITED STATES PATENT OFFICE.

ALBERT N. OTIS, OF SCHENECTADY, NEW YORK, ASSIGNOR TO GENERAL ELECTRIC COMPANY, A CORPORATION OF NEW YORK.

TEMPERATURE REGULATOR.

Application filed February 4, 1922. Serial No. 534,238.

*To all whom it may concern:*

Be it known that I, ALBERT N. OTIS, a citizen of the United States, residing at Schenectady, in the county of Schenectady, State of New York, have invented certain new and useful Improvements in Temperature Regulators, of which the following is a specification.

My invention relates to temperature regulators and has for its object the provision of a method and means for varying the rate of changing the heat input in accordance with the magnitude of the temperature changes.

More specifically my invention relates to temperature regulators for electrically heated devices, such as electric furnaces, although it has application to various types of heaters. I have found that it is desirable in regulating temperature, so as to maintain a predetermined average working temperature, to vary the rate of heat input rapidly upon wide variations in temperature, thus quickly bringing the temperature approximately to the desired mean value, and then vary the rate of input slowly as the temperature nears the mean value, or upon relatively small variations in temperature, so as to maintain the temperature closely at such mean value. In this manner corrections are made for small changes in temperature by gradually changing the rate of heat input, while corrections are made for relatively wide changes in temperature by rapidly changing the rate of heat input.

In carrying out my invention in one form I provide two step by step devices of the type shown in patent to Edgar F. Collins, No. 1,287,236, dated December 10, 1918, which are controlled by a temperature responsive element, for giving respectively coarse and fine adjustments of the rate of heat input, the coarse device being utilized upon wide variations in temperature, while the fine device serves to correct for slight variations so as to maintain the temperature accurately at the predetermined mean value.

For a more complete understanding of my invention reference should be had to the accompanying drawing in the single figure of which is shown in diagrammatic form a temperature regulator for an electric furnace embodying my invention.

Referring to the drawing, in one form of my invention a furnace 10, the temperature of which is to be regulated, is provided with a suitable electric heating element 11, shown as a three circuit resistance element, which is connected by conductors 12, 13 and 14 through a voltage regulator 15 to mains 16, 17 and 18, energized from a suitable source of three-phase electric supply. The regulator 15 may be of any suitable type such as an induction voltage regulator. It is actuated by means of a three-phase electric motor 19 and controls the voltage impressed on the resistance heater 11, thereby regulating the energy input to the electric heater and hence the temperature of the furnace. The electric motor 19 is operated from supply mains 16, 17 and 18. One terminal is connected directly by conductor 20 to main 17, while the other two terminals are connected by conductors 21 and 22 through a reversing switch 23 and conductors 24 and 25 to mains 16 and 18. The reversing switch 23 comprises pairs of movable contacts 26 and 27 actuated, respectively, by operating coils 28 and 29. Cooperating with the pairs of movable contacts are corresponding pairs of stationary contacts 30 and 31. Movable contacts 26 and stationary contacts 31 are connected to conductors 21 and 22, but in reverse relation, while stationary contacts 30 and movable contacts 27 are connected to conductors 24 and 25. As thus arranged, it will be observed that the movable contacts 26 and 27 are actuated by operating coils 28 and 29 to connect conductors 21 and 22 to mains 16 and 18 in reverse relations so as to govern the direction of rotation of the motor.

The operating coils 28 and 29 for reversing switch 23 are energized from supply mains 17 and 18, and the energization of the coils is controlled by means of a pyrometer 35 located in the furnace 10 in such manner that motor 19 is caused to operate regulator 15 and regulate the voltage impressed on the heater 11 so as to maintain a predetermined mean temperature in the furnace. The pyrometer 35 may be and is shown in the form of a thermal couple, the terminals of which are connected through conductors 36 and 37 to electroresponsive devices or galvanometers 38 and 39. Flexible pointers 40 and 41 are carried by the moving elements of the galvanometers. As pointer 40 moves across its scale in response to changes in temperature of the furnace, it moves in front of or across a pair of spaced contacts 42 and 43, but without touching them. These contacts 42 and 43 are adjustable with relation to each other and also along the path of pointer 40, whereby the contacts may be adjusted so that pointer 40 stands opposite the gap between them at a certain mean temperature in the furnace, in front of one at a predetermined minimum temperature, and in front of the other at a predetermined maximum temperature. A similar pair of adjustable contacts 44 and 45 is provided in conjunction with pointer 41. Contacts 42 and 44 are connected through a conductor 46 and operating coil 28 to main 17, while contacts 43 and 45 are connected through a conductor 47 and operating coil 29 to supply main 17.

Operating in conjunction with pairs of stationary contacts 42, 43 and 44, 45 are two reciprocating devices 50 and 51 carrying insulated contacts 52 and 53, each of which is of sufficient width to extend across the pair of stationary contacts adjacent thereto. The opposite ends of the reciprocating members 50 and 51 are provided with suitable rollers which ride on cam members 54 and 55. These cam members are secured to a shaft 56 which is operated slowly at a constant speed through gearing 57 by a suitable constant speed operating means, such as an electric motor 58. This electric motor may be time controlled so as to be maintained at a constant speed, or connected to a suitable source of electrical supply adapted to operate it at a constant speed. The moving contacts 52 and 53 are connected through a conductor 59 to supply main 18. The arrangement of the contacts in conjunction with galvanometers 38 and 39 is substantially as disclosed in the aforesaid patent to Collins, and forms no part of my invention.

Cam 54 is provided with a wide raised portion 60, shown as extending through an approximately 180° arc, while cam 55 is provided with a relatively short raised portion or projection 61. The cams are preferably arranged on shaft 56 with the raised portions 60 and 61 approximately diametrically opposite each other. As the cams are rotated by motor 58, members 50 and 51 are alternately reciprocated, and when resting on the raised portions of the cams bring contacts 52 and 53 in close proximity to but without touching their respective pairs of stationary contacts. Pointer 40 takes a path between the pair of stationary contacts 42 and 43 and moving contact 52, while pointer 41 takes a path between the pair of stationary contacts 44 and 45 and moving contact 53. When either pointer is in front of one of its stationary contacts it is pinched or clamped between that stationary contact and its moving contact when the moving contact is brought into close proximity thereto by its operating cam. In this manner a circuit is established through the pointer between the moving contact and the stationary contact in question for operating coil 28 or 29 as the case may be. Due to the fact that raised portion 60 is much longer than raised portion 61, it will be observed that contact 52 will be maintained in closed circuit position for a correspondingly longer period than contact 53.

The adjustment of the pairs of stationary contacts is such that each pointer stands between its pair of stationary contacts at some predetermined mean temperature, such as 1500° F. Contacts 42 and 43 are also so adjusted that pointer 40 moves in front of one or the other of them, so as to be periodically pinched by contact 52, upon the occurrence of a relatively great change in temperature such, for example, as 25° F. above or below the predetermined mean temperature. The adjustment of contacts 44 and 45 is such that pointer 41 is pinched by contact 53 upon a relatively small change in temperature, such as 10° F.

As thus constructed and arranged, the operation of my invention is as follows: Assuming that the furnace is operating at the desired mean temperature, which for the purpose of illustration will be taken as 1500° F., the positions of the various parts will be as shown in the drawing, switch 23 consequently being open and motor 19 at rest. Motor 58 meanwhile operates at a constant speed, reciprocating contacts 52 and 53 periodically into contact with pointers 40 and 41. Assuming, for example, that a decrease in temperature causes the pointers to move toward the left, should the temperature decrease for any reason whatever to 1490° F., or 10° below the predetermined mean temperature, then pointer 41 moves in front of contact 44 and upon the next upward movement of member 51 is pinched by contact 53. A circuit is thus closed through operating coil 28 leading from main 17 through the coil, conductor 46, contact 44, pointer 41, contact 53 and conductor 59 to main 18. Operating coil 28 thereupon picks up movable contacts 26, connecting mains 17 and 18 to motor 19 whereby the motor is caused to operate in a direction to increase the voltage impressed on the heater 11. This adjustment of the voltage is relatively small, however, due to the fact that the control circuit for coil 28 is maintained closed only for the short period of time that the reciprocating member 51 rests upon projection 61 of cam 55. Upon the next succeeding revolution of cam 55, if pointer 41 is still in front of contact 44, the circuit for motor 19 will be again closed, as previously described, whereby the motor operates to increase the voltage applied to the heater by another small increment. The system operates as thus described, periodically increasing the voltage impressed on the furnace until the temperature of the furnace has been raised sufficiently to cause pointer 41 to move between contacts 44 and 45. In case, however, the temperature of the furnace continues to decrease and should reach a value 25° below the predetermined mean temperature, or when the furnace is being started up, pointer 40 will be pinched between contacts 42 and 52 so as to close the circuit for operating coil 28 as member 50 rides upon the raised portion 60 of cam 54. Due to the fact that portion 60 is of considerable length, coil 28 will be energized for a much greater length of time than is possible with projection 61, whereby motor 19 will be operated periodically to increase the voltage applied to the heater by much greater increments. At the same time the voltage is given small increments under the control of cam 55, as previously described. As the temperature of the furnace rises to within 25° of the predetermined mean, pointer 40 moves to open circuit position, followed by pointer 41 as the temperature comes within 10° of this temperature.

It will be observed that in this manner the rate of electrical input to the heater, and hence the rate of heat input to the furnace, is changed very slowly upon slight variations in temperature, and this change is made in the form of steps, giving the heater an appreciable time between each change in voltage to adjust the temperature of the furnace. Upon relatively great changes in temperature, however, the rate of electrical input to the heater is varied rapidly by large increments, and the temperature of the furnace consequently varied at a much greater rate. In other words, small variations in temperature are taken care of slowly, while relatively large variations are compensated for rapidly.

Should the temperature of the furnace rise above the desired working temperature, then pointer 41 will, upon an increase of 10°, be pinched between contacts 45 and 53 so as to close a circuit for operating coil 29 leading from main 17 through the coil, conductor 47, contact 45, pointer 41, contact 53 and conductor 59 to main 18. Operating coil 29 thereupon picks up contacts 27 into engagement with contacts 31 closing a circuit for motor 19, whereby the motor is caused to operate in the reverse direction and decrease the voltage applied to the heater. The voltage is decreased by successive decrements as cam 55 rotates until the temperature of the furnace decreases and pointer 41 moves to open circuit position. In case the temperature of the furnace should rise 25° above the desired working temperature, pointer 40 will be pinched between contacts 43 and 52. In this manner the circuit for cooperating coil 29 is closed for a longer period of time, and motor 19 caused to lower the voltage applied to the heater by larger decrements, the two step by step devices working together and being successively cut out as the temperature approaches the predetermined mean, as will be understood from the previous description.

While I have described my invention as embodied in concrete form and as operating in a specific manner in accordance with the provisions of the patent statutes, it should be understood that I do not limit my invention thereto, since various modifications thereof will suggest themselves to those skilled in the art without departing from the spirit of my invention, the scope of which is set forth in the annexed claims.

What I claim as new and desire to secure by Letters Patent of the United States, is:

1. A temperature regulator comprising in combination with a heated device, a heater therefor, and means responsive to the temperature of said device for regulating the output of said heater at a low rate upon the occurrence of relatively small variations in temperatures from a predetermined mean temperature and at a high rate upon the occurrence of relatively great variations in temperature from said predetermined mean temperature.

2. A temperature regulator comprising in combination with a heated device, a heater therefor, and means responsive to the temperature of said device for regulating the output of said heater by fine steps upon the occurrence of relatively small temperature variations from a predetermined mean temperature and by coarse steps in response to relatively great temperature variations from said predetermined mean temperature.

3. A temperature regulator comprising in combination with a heated device, an electric heater therefor, and means responsive to the temperature of said device for controlling the energy input to said heater slowly upon the occurrence of relatively small variations in temperature from a predetermined mean temperature and rapidly upon the occurrence of relatively great variations in temperature from said predetermined mean temperature.

4. A temperature regulator comprising in combination with a heated device, an electric heater therefor, and means responsive to the temperature of said device for varying the energy input to said heater by fine steps upon the occurrence of relatively small temperature variations from a predetermined mean temperature, and by coarse steps upon the occurrence of relatively large temperature variations from said predetermined mean temperature.

5. A temperature regulator comprising in combination with a heated device, an electric heater therefor, voltage control means for said heater, and means responsive to the temperature of said device for adjusting said voltage control means at a predetermined rate upon the occurrence of relatively small variations in temperature from a predetermined means temperature and at a predetermined higher rate upon the occurrence of relatively great temperature changes.

6. A temperature regulator comprising in combination with a heated device, an electric heater therefor, and means responsive to the temperature of said device for varying the energy input to said heater at a plurality of predetermined rates depending on the relation of the temperature of said device to a predetermined mean temperature to be maintained.

7. A temperature regulator comprising in combination with a heated device, an electric heater therefor, means responsive to the temperature of said device for varying the energy input to said heater at a predetermined rate upon the occurrence of variations in the temperature of said device within a predetermined range from a predetermined mean temperature, and means responsive to the temperature of said device for varying the power input to said heater at a predetermined greater rate upon the occurrence of greater variations in the temperature of said device.

8. A temperature regulator comprising in combination with a heated device, an electric heater therefor, voltage control means for said heater, an electric motor for actuating said voltage control means, and means responsive to the temperature of said device for controlling said motor so as to adjust said voltage control means by fine steps in response to small temperature changes and by coarse steps in response to wide temperature changes.

9. The method of regulating a heater which consists in controlling said heater slowly upon the occurrence of relatively small variations in temperature from a predetermined mean temperature and rapidly upon the occurrence of relatively large variations in temperature from said predetermined mean temperature.

10. The method of regulating an electric heater which consists in controlling the energy input to said heater at a predetermined low rate upon the occurrence of relatively small variations in temperature from a predetermined mean temperature and at a predetermined higher rate upon the occurrence of relatively large variations in temperature from said predetermined mean temperature.

11. The method of regulating an electric heater which consists in controlling the energy input to said heater by fine steps to correct for relatively small temperature variations from a predetermined mean temperature and by coarse steps to correct for relatively large temperature variations from said predetermined mean temperature.

In witness whereof, I have hereunto set my hand this 3rd day of February, 1922.

ALBERT N. OTIS.